United States Patent
Chang et al.

(10) Patent No.: US 11,740,469 B2
(45) Date of Patent: Aug. 29, 2023

(54) EYEPIECE FOR HEAD-MOUNTED DISPLAY AND METHOD FOR MAKING THE SAME

(71) Applicant: Magic Leap, Inc., Plantation, FL (US)

(72) Inventors: Chieh Chang, Cedar Park, TX (US); Christophe Peroz, San Francisco, CA (US); Ryan Jason Ong, Austin, TX (US); Ling Li, Cedar Park, TX (US); Sharad D. Bhagat, Austin, TX (US); Samarth Bhargava, Saratoga, CA (US)

(73) Assignee: Magic Leap, Inc., Plantation, FL (US)

( * ) Notice: Subject to any disclaimer, the term of this patent is extended or adjusted under 35 U.S.C. 154(b) by 54 days.

(21) Appl. No.: 17/359,195

(22) Filed: Jun. 25, 2021

(65) Prior Publication Data
US 2021/0405372 A1 Dec. 30, 2021

Related U.S. Application Data

(60) Provisional application No. 63/044,124, filed on Jun. 25, 2020.

(51) Int. Cl.
*G02B 27/01* (2006.01)
*G02B 27/00* (2006.01)
*G02B 6/02* (2006.01)

(52) U.S. Cl.
CPC ..... *G02B 27/0172* (2013.01); *G02B 6/02033* (2013.01); *G02B 6/02066* (2013.01); *G02B 27/0081* (2013.01); *G02B 2027/0178* (2013.01)

(58) Field of Classification Search
CPC .............. G02B 27/017; G02B 27/0172; G02B 27/0081; G02B 6/02033; G02B 6/02066; G02B 2027/0178; G02B 2027/0174
See application file for complete search history.

(56) References Cited

U.S. PATENT DOCUMENTS

| | | | |
|---|---|---|---|
| 2013/0229712 A1* | 9/2013 | Kress | G02B 5/1861 |
| | | | 359/572 |
| 2018/0052320 A1* | 2/2018 | Curtis | G02C 11/10 |
| 2019/0170932 A1* | 6/2019 | Miller | G02F 1/3515 |
| 2020/0041712 A1 | 2/2020 | Peroz et al. | |
| 2020/0144109 A1* | 5/2020 | Meyer Timmerman Thijssen | H01L 21/3083 |
| 2020/0402871 A1 | 12/2020 | Li et al. | |

OTHER PUBLICATIONS

International Search Report and Written Opinion in International Appln No. PCT/US2021/039208, dated Sep. 30, 2021, 10 pages.

* cited by examiner

*Primary Examiner* — Nitin Patel
*Assistant Examiner* — Cory A Almeida
(74) *Attorney, Agent, or Firm* — Fish & Richardson P.C.

(57) ABSTRACT

A method, includes providing a wafer including a first surface grating extending over a first area of a surface of the wafer and a second surface grating extending over a second area of the surface of the wafer; de-functionalizing a portion of the surface grating in at least one of the first surface grating area and the second surface grating area; and singulating an eyepiece from the wafer, the eyepiece including a portion of the first surface grating area and a portion of the second surface grating area. The first surface grating in the eyepiece corresponds to an input coupling grating for a head-mounted display and the second surface grating corresponds to a pupil expander grating for the head-mounted display.

20 Claims, 10 Drawing Sheets

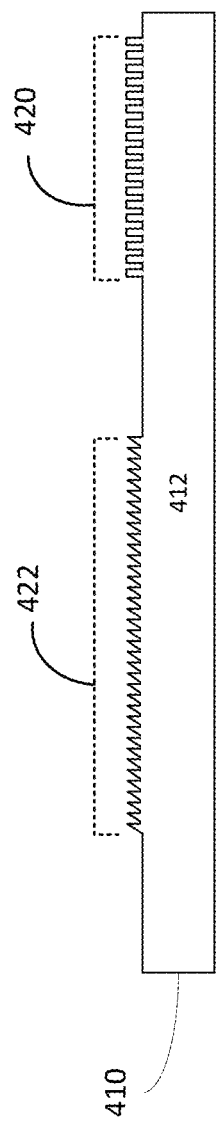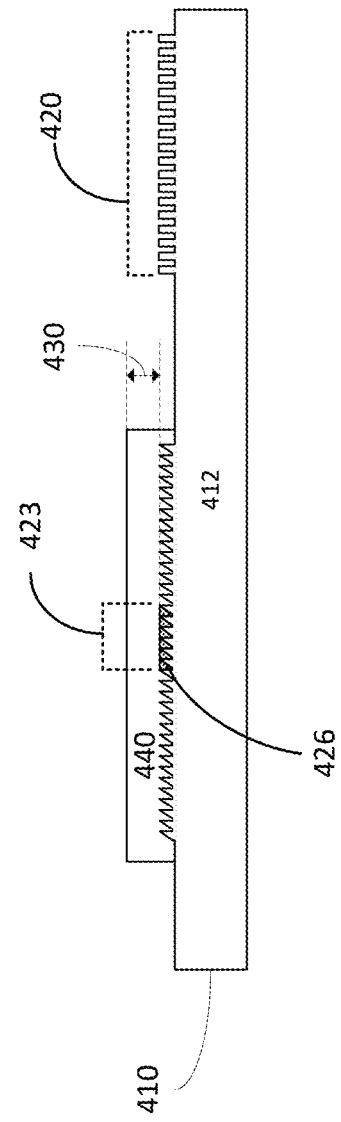

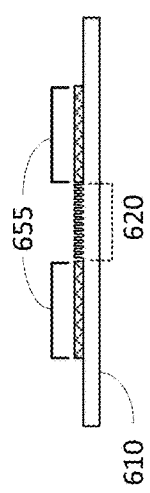
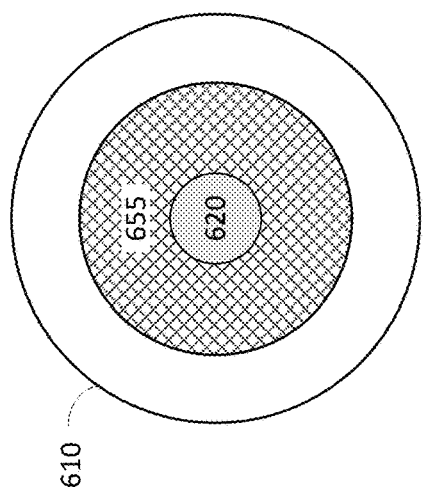
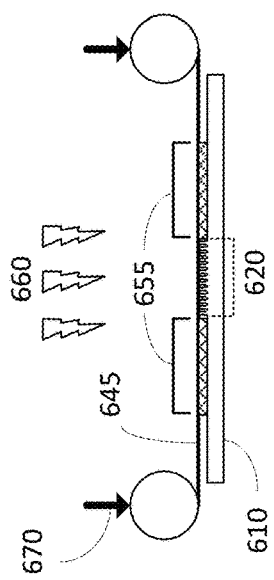
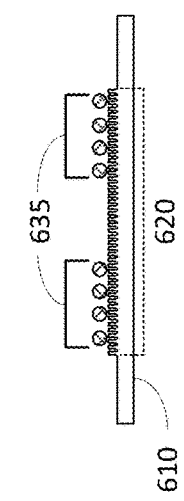
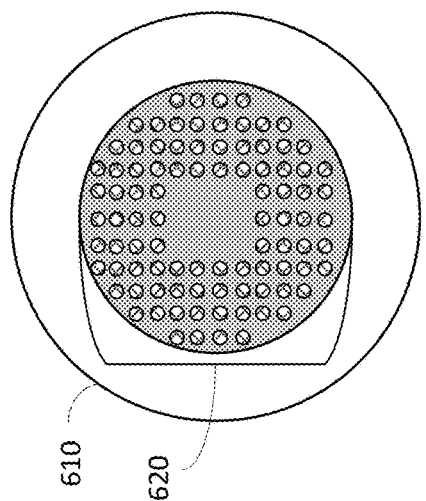

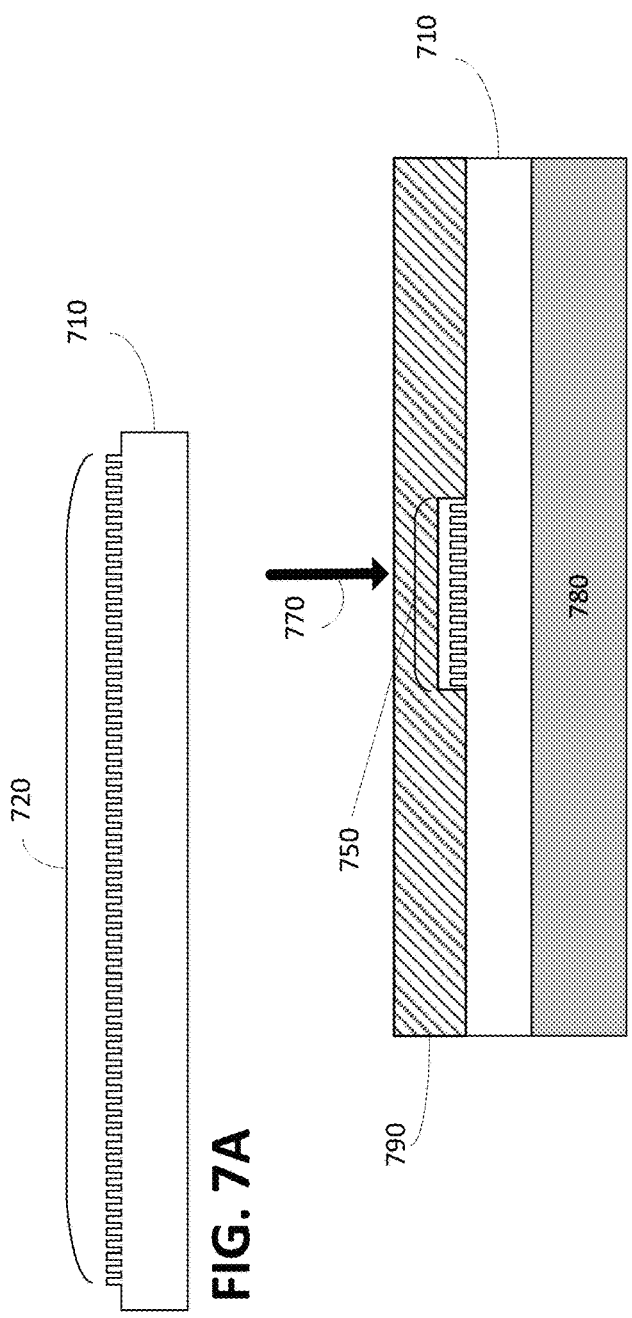
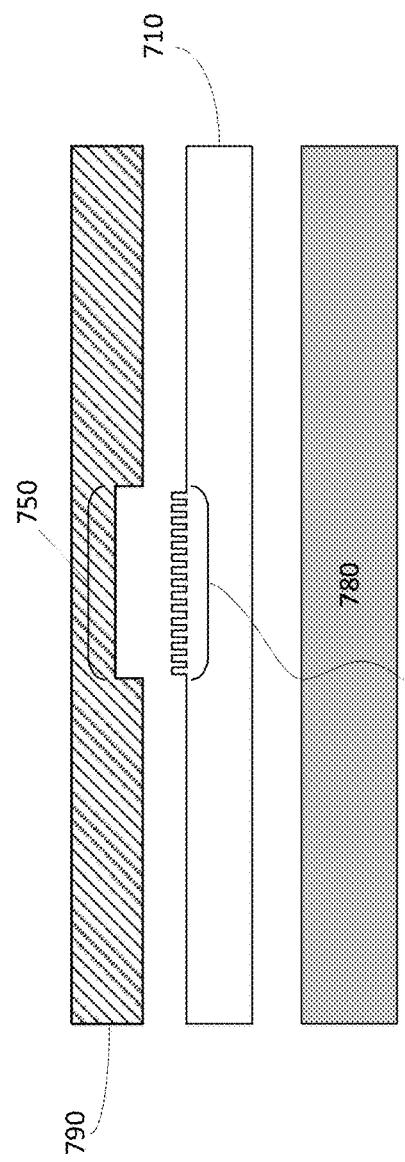

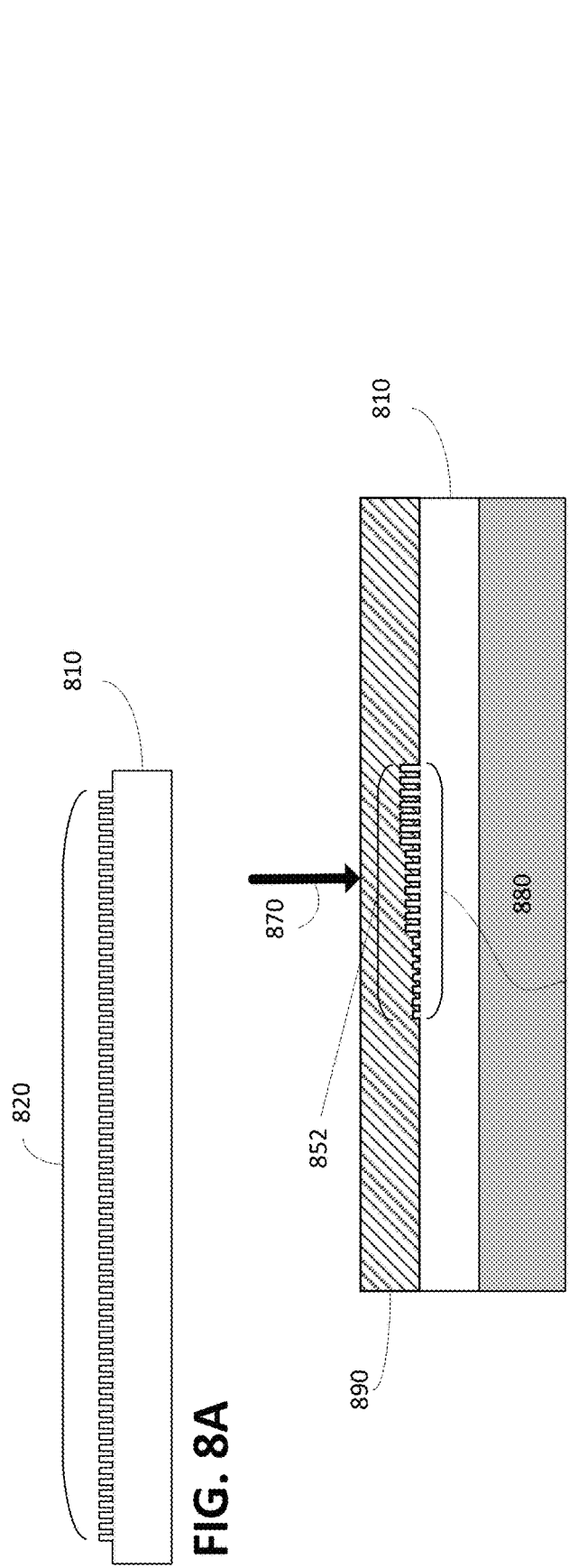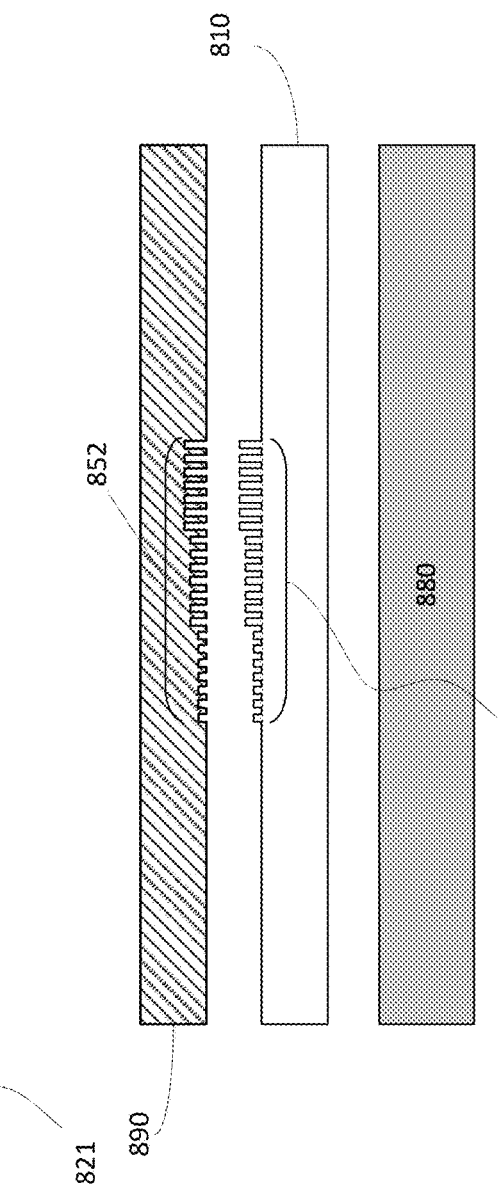

EYEPIECE FOR HEAD-MOUNTED DISPLAY AND METHOD FOR MAKING THE SAME

CLAIM OF PRIORITY

This application claims priority under 35 USC § 119(e) to U.S. Patent Application Ser. No. 63/044,124, filed on Jun. 25, 2020, the entire contents of which are hereby incorporated by reference.

FIELD OF THE DISCLOSURE

The disclosure relates to head-mounted displays and more specifically, to eyepieces for head-mounted displays and methods for making the eyepieces.

BACKGROUND

Optical imaging systems, such as wearable display systems (e.g., wearable display headsets) can include one or more eyepieces that present projected images to a user. Eyepieces can be constructed using thin layers of one or more highly refractive materials. As examples, eyepieces can be constructed from one or more layers of highly refractive glass, silicon, metal, or polymer substrates.

Multiple eyepieces can be used in conjunction to project a simulated three-dimensional image. For example, multiple eyepieces—each having a different pattern—can be layered one atop another, and each eyepiece can project a different depth layer of a volumetric image. Thus, the eyepieces can collectively present the volumetric image to the user across three-dimensions. This can be useful, for example, in presenting the user with a "virtual reality" environment.

In some cases, the eyepieces include thin layers of material include surface gratings formed on their respective surfaces. The layers can be formed by casting the material and molding the surface gratings during the casting process. Gratings for multiple eyepieces can be cast in a single film and the individual eyepieces singulated from the cast film.

SUMMARY

In certain implementations, an eyepiece used in a wearable display headset uses two surface gratings: one for injecting projected light into the waveguide (e.g., an input coupling grating) and another for increasing the size of the display's exit pupil (e.g., a pupil expander grating). These eyepieces are generally singulated (e.g., cut) from master polymer wafers into which the surface gratings are molded. These wafers are generally cast with grating arrangements that are set by the mold, establishing the areas covered by the two surface gratings, the shape, pitch, and orientation of each grating, and the spacing between the two grating areas.

The eyepiece surface grating areas may be cast and oriented such that a wide range of distances between user pupils may be accommodated. This accommodation is achieved through casting of master polymer layers that include over-sized areas for either or both the input coupling grating and pupil expander grating areas. The over-sized areas are then partially de-functionalized to reduce the area of the grating such that eyepieces with accommodating different pupillary distances may be accommodated using a single wafer mold.

Various aspects of the invention are summarized as follows.

In general, in a first aspect, the invention features a method including: providing a wafer including a first surface grating extending over a first area of a surface of the wafer and a second surface grating extending over a second area of the surface of the wafer; de-functionalizing a portion of the surface grating in at least one of the first surface grating area and the second surface grating area; and singulating an eyepiece from the wafer, the eyepiece comprising a portion of the first surface grating area and a portion of the second surface grating area. The first surface grating in the eyepiece corresponds to an input coupling grating for a head-mounted display and the second surface grating corresponds to a pupil expander grating for the head-mounted display.

Embodiments of the method can include one or more of the following features. De-functionalizing the portion of the first or second surface gratings can include planarizing the portion of the corresponding surface grating. Planarizing the portion of the first or second surface gratings can include casting a material over the corresponding portion of the surface grating. The material being cast can be the same material as the material forming the surface grating.

In some embodiments, the method can further include depositing a reflective material on a portion of the first surface grating. The reflective material can be a metal.

The de-functionalized portion of the first or second surface grating areas can have a height above the surface that greater than a height of the first or second surface grating features. Tor a de-functionalized portion of the first or second surface grating areas, the height of the de-functionalized portion can be no more than 100 nm greater than the height of the corresponding surface grating features.

Providing the wafer can include imprinting the first and second gratings onto the surface of the wafer. Alternatively, providing the wafer can include casting a wafer with the first and second gratings.

The second area can have a minimum lateral dimension of more than 30 mm.

The pupil expander grating has a maximum lateral dimension of 30 mm or less.

The input coupling grating has a maximum lateral dimension of 5 mm or less.

In some embodiments, the method can further include assembling the eyepiece in a head-mounted display.

In a second aspect, the invention features an article including: a planar waveguide formed from a polymer material, the planar waveguide including a first surface, the first surface including: a first surface grating; a second spaced apart from the first surface grating; and a smooth portion between the first and second surface gratings. The smooth portion includes a first region at a first surface height, the first and second gratings each extend above the first surface height, and the smooth portion includes a second region adjacent either the first or second surface grating, the second region extending to a height above the adjacent surface grating.

Embodiments of the article can include one or more of the following features. The article can further include a reflective layer supported by the first surface grating. The first surface grating and the reflective layer can be configured to couple light incident into the planar waveguide propagating towards the second surface grating.

The second surface grating can be configured to direct light guided by the waveguide out of the waveguide.

The second region can extend 100 nm or less above the adjacent surface grating.

The first surface grating can have a maximum lateral dimension of 5 mm or less and the second surface grating can have a maximum lateral dimension of 30 mm or less.

The first and second gratings can be separated by 10 mm or more.

In a third aspect, the invention further features a head-mounted display including an eyepiece including the article of the invention. The display can be a virtual retina display.

Among other advantages, implementations can provide manufacturing efficiencies by allowing eyepieces for different pupillary distances to be made using a single mold geometry.

Other advantages will be apparent from the description, the drawings, and the claims.

BRIEF DESCRIPTION OF THE DRAWINGS

FIGS. 4A and 4B are schematic diagrams showing an example method for de-functionalizing surface grating areas corresponding to an input coupling grating.

FIGS. 6A-6E are schematic diagrams showing steps in an example method for de-functionalizing surface grating areas using polymer droplets.

FIGS. 7A-7C are schematic diagrams showing steps in an example method for de-functionalizing surface grating areas using a heated stage and a stamp with a void.

FIGS. 8A-8C are schematic diagrams showing steps in an example method for de-functionalizing surface grating areas using a heated stage and a stamp with a inset grating.

In the figures, like symbols indicate like elements.

DETAILED DESCRIPTION

Figure 1A:
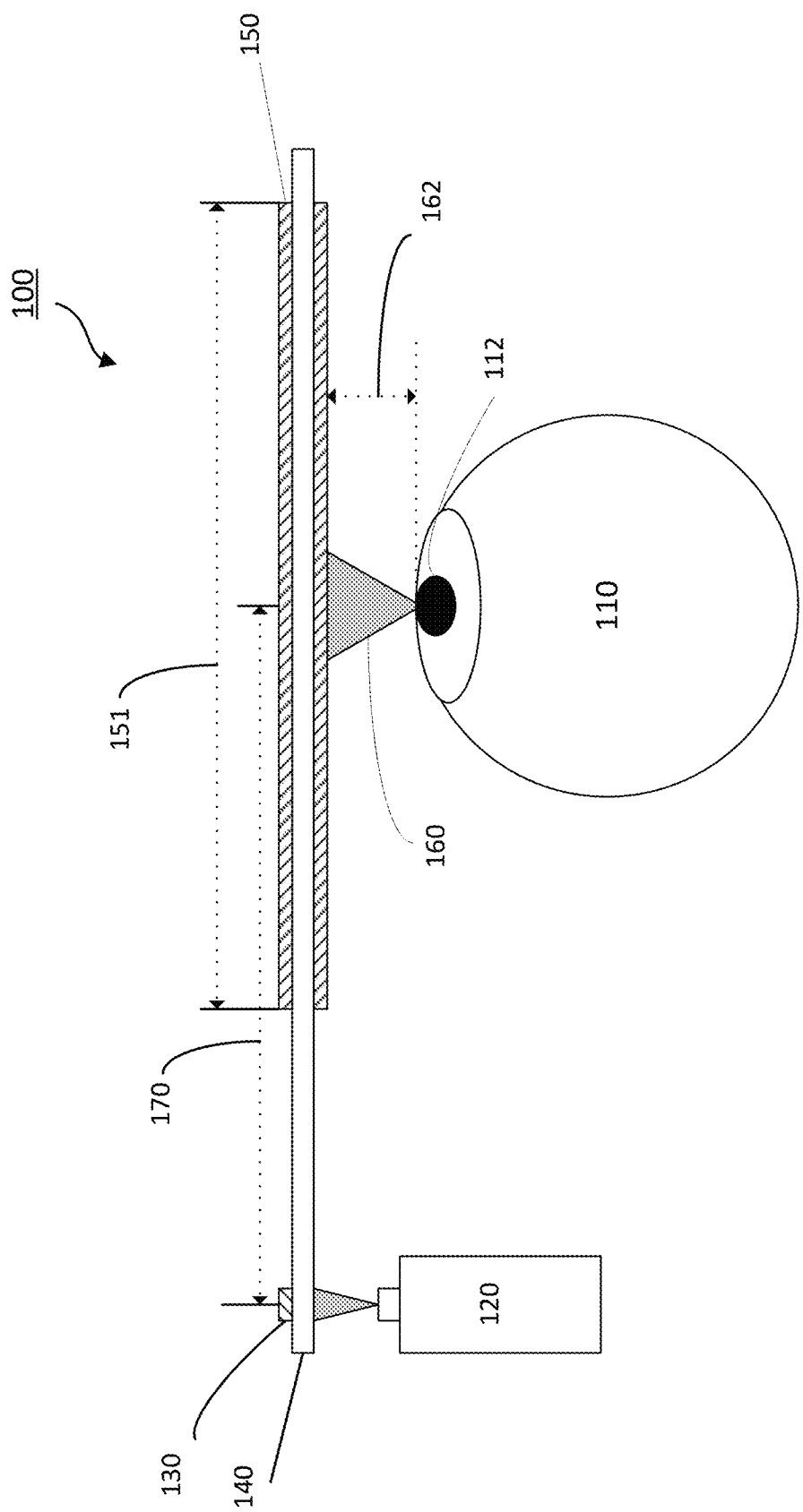
FIGS. 1A and 1B are schematic diagrams depicting portions of a head-mounted display and the alignment of the display's eyepiece with a user's eyes.

Referring to FIG. 1A, an eyepiece 100 of a head-mounted display system directs light from a projector 120 to the eye 110 of a user. The projector 120 and eyepiece 100 are positioned relative to one another and to the eye 110 of the user by a frame or housing (not shown). The projector 120 is located beside the user's temple and directs light to an end of the eyepiece 100 that extends past the user's temple. Eyepiece 100 includes a planar waveguide 140, an input coupling grating (ICG) 130, and out-coupling element (OCE) 150.

ICG 130 is a surface grating positioned to receive light from projector 120 and facilitates in-coupling of light from projector 120 into the eyepiece 100. The ICG 130 is located at or close to the edge of the eyepiece 100 closest to the projector 120. The ICG 130 directs the light from the projector 120 into guided modes in the planar waveguide substrate 140 of eyepiece 100.

The ICG 130 may be of any size sufficient to receive the light from the projector. In some embodiments, the lateral dimension can be in a range from 0.5 mm to 5.0 mm (e.g., 1.0 mm or more, 1.5 mm or more, 2.0 mm or more, 2.5 mm or more, such as 4.0 mm or less, 3.0 mm or less).

The planar waveguide substrate 140 guide the in-coupled light along the eyepiece 100 through total internal reflection at its surfaces to the out-coupling element (OCE) 150. The OCE 150 is a second surface grating configured to extract the light out of the planar waveguide substrate 140 and redirect it towards the eye 110 of the user. The OCE 150 can include an exit pupil expander (EPE) or an orthogonal pupil expander (OPE) or both. Ideally, the OCE 150 is located in front of the user's eye 110, so light can be delivered from the projector to an eyebox 160, described below. The OCE 150 can further have a lateral dimension 151 to accommodate a range of lateral positions of the eyebox 160. For example, a non-limiting range of the lateral dimension 151 of the OCE 150 can be 30 mm or less (e.g., 25 mm or less, 20 mm or less, 15 mm or less).

The eyebox 160 is considered to be the region in which a pupil 112 of the user can be positioned to receive light outputted from the OCE 150. The eyebox 160 can include a range of reliefs 162 from the planar waveguide substrate including, but not limited to, 5 mm to 25 mm (e.g., 5 to 10 mm, 5 to 15 mm, 5 to 20 mm, 10 to 25 mm, 15 to 25 mm, 20 to 25 mm).

Figure 1B:
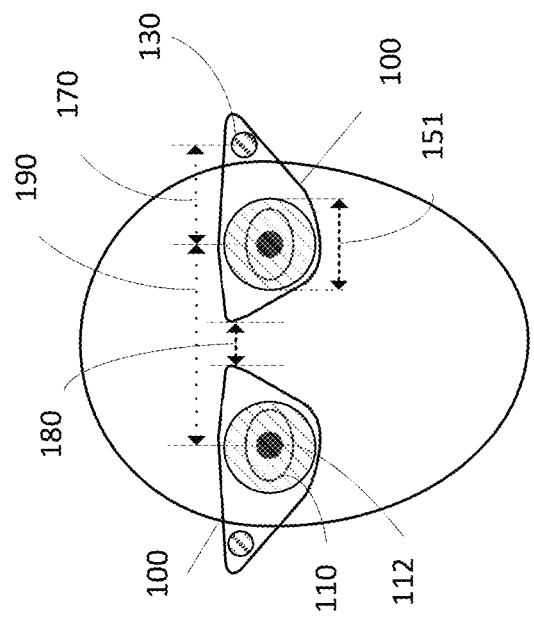

Referring to FIG. 1B, when positioned in a head mounted display system, a pair of eyepieces 100 are positioned so that a lateral eyepiece spacing 180 accommodates the center-to-center distance between the user's pupils 112, termed an inter-pupillary distance (IPD) 190. Generally, IPD 190 can vary across a group of individuals. On average, adults have an IPD of about 62 mm, but this can vary from about 50 mm to about 80 mm In general, eyepieces 100 can be made with a single center-to-center distance 170 between the ICG 130 and the OCE 150, but with an oversized OCE 150 (e.g., having a lateral dimension 36 mm or more) so that the eyepiece can accommodate a range of IPDs 190.

In some embodiments, multiple eyepieces 100 can be singulated from a single master polymer wafer. The master polymer wafer can include a first surface grating extending over a first area of a surface of the wafer and a second surface grating extending over a second area of the surface of the wafer. The first and second surface grating areas can be cast into the master polymer wafer at the time of molding. Alternatively, the first and second surface grating areas can be imprinted into the master polymer wafer after molding. The eyepieces 100 can be singulated from the master polymer wafer such that they include an OCE surface grating area, an ICG surface grating area, and a smooth portion between the two surface grating areas.

The methods described below can be used to produce eyepieces having one or more different OCE 150 and ICG 130 surface grating areas in one or more different configurations and orientations using a single master polymer wafer mold. In this manner, multiple eyepieces can be singulated from the master polymer wafer with different surface grating center-to-center distances on each.

Figure 2:
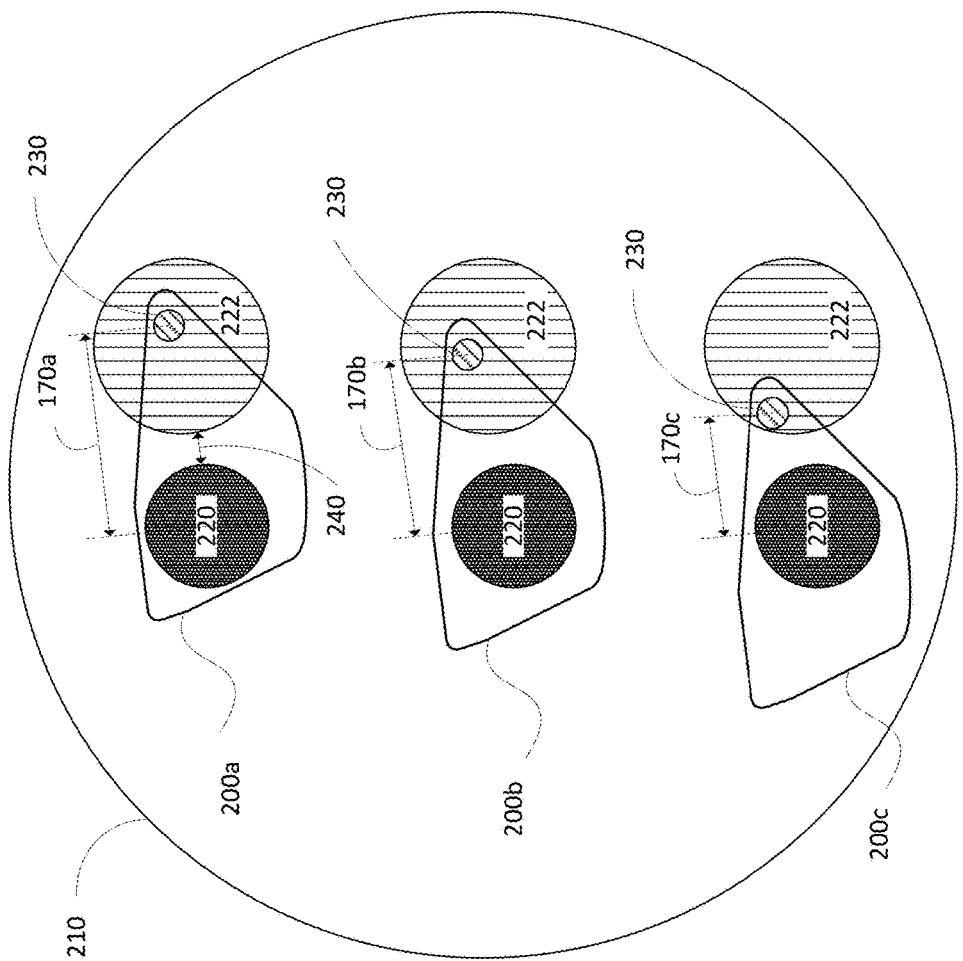
FIG. 2 is a schematic diagram showing an example of a master polymer wafer with multiple surface grating areas and example singulation lines for multiple lenses.

For example, in some implementations, a master polymer wafer can include an over-sized surface grating area that allows eyepiece singulation in a range of center-to-center distances. Referring to FIG. 2, an example master polymer wafer 210 includes surface grating areas from which three different eyepieces can be singulated. Master polymer wafer 210 is cast with three surface grating areas 220 corresponding to three OCEs. Further, master polymer wafer 210 has three over-sized surface grating area 222 corresponding to three ICGs 230. The surface grating areas 220 and over-sized surface grating area 222 are separated by a smooth portion 240. Typically, surface grating areas 220 and oversized surface grating area 222 are imprinted on the surface of the master polymer wafer 210.

Because the surface grating areas 222 are over-sized (i.e., larger than the area needed for the ICG 230s), eyepieces can be singulated to encompass different portions of the over-sized grating area and still provide a portion of grating area 222 at a suitable location for ICG 230 relative to the edge of the eyepiece. This is illustrated in FIG. 2, where eyepieces 200a, 200b, and 200c are singulated to provide three different spacings between the eyepiece's OCE. Specifically, for eyepiece 200a, the eyepiece is singulated to encompass a relatively large portion of grating area 222, yielding a large spacing 170a between the ICG 230 and the center of grating area 220. For eyepiece 200b, the singulation encompasses an intermediate portion of grating area 222, providing a medium spacing 170b between the ICG and center of grating area 220. For eyepiece 200c, the singulation encompasses a small area of grating area 222, corresponding to a small spacing 17-c between the ICG and the center of grating area 220. Note that in each case, ICG 230 is at the same location with respect to the edge of the eyepiece. As will be described in greater detail below, either before or after singulation, the portions of grating areas 222 that are outside of ICG 230 can be de-functionalized, leaving only the grating in the area corresponding to the ICG.

In general, the dimensions of grating areas 220 and 222, and the spacing between them 240, can vary as appropriate depending on the size and shape of the eyepiece, the ICG, and the OCE. In some embodiments, space 240, corresponding to a smooth portion, can be 10 mm or more (e.g., 15 mm or more, 20 mm or more). The first surface grating areas 220 corresponding to the OCEs can have a diameter in a range from 20 mm to 40 mm (e.g., 22 mm or more, 25 mm or more, 28 mm or more, such as 35 mm or less, 30 mm or less).

The surface grating areas 222 should be sufficiently large to allow ICGs to be provided at multiple different locations. Accordingly, area 222 can have at least one dimension (e.g., a diameter) that is at least twice as large (e.g., 3× or more, 4× or more, 5× or more) as a maximum dimension of the ICG. In some embodiments, surface grating area 222 has a diameter in a range from 5 mm to 50 mm (e.g., 8 mm or more, 10 mm or more, 15 mm or more, 20 mm or more, such as 40 mm or less, 30 mm or less).

The master polymer wafer 210 can be made of any polymer material fit for production of lenses with appropriate surface gratings.

While FIG. 2 depicts the surface grating areas 220 and the surface grating areas 222 as circular, more generally, the surface grating areas 220 and 222 can be of any shape (e.g., circular, square, triangular). Moreover, while FIG. 2 depicts three eyepieces being singulated from polymer wafer 210, wafers can be sized to provide fewer or more than three eyepieces (e.g., two, four, five, six or more).

After singulation of eyepieces 200 from a master polymer wafer 210, the eyepieces 200 can then be further processed as necessary and finally assembled in to head-mounted display.

Figure 3:
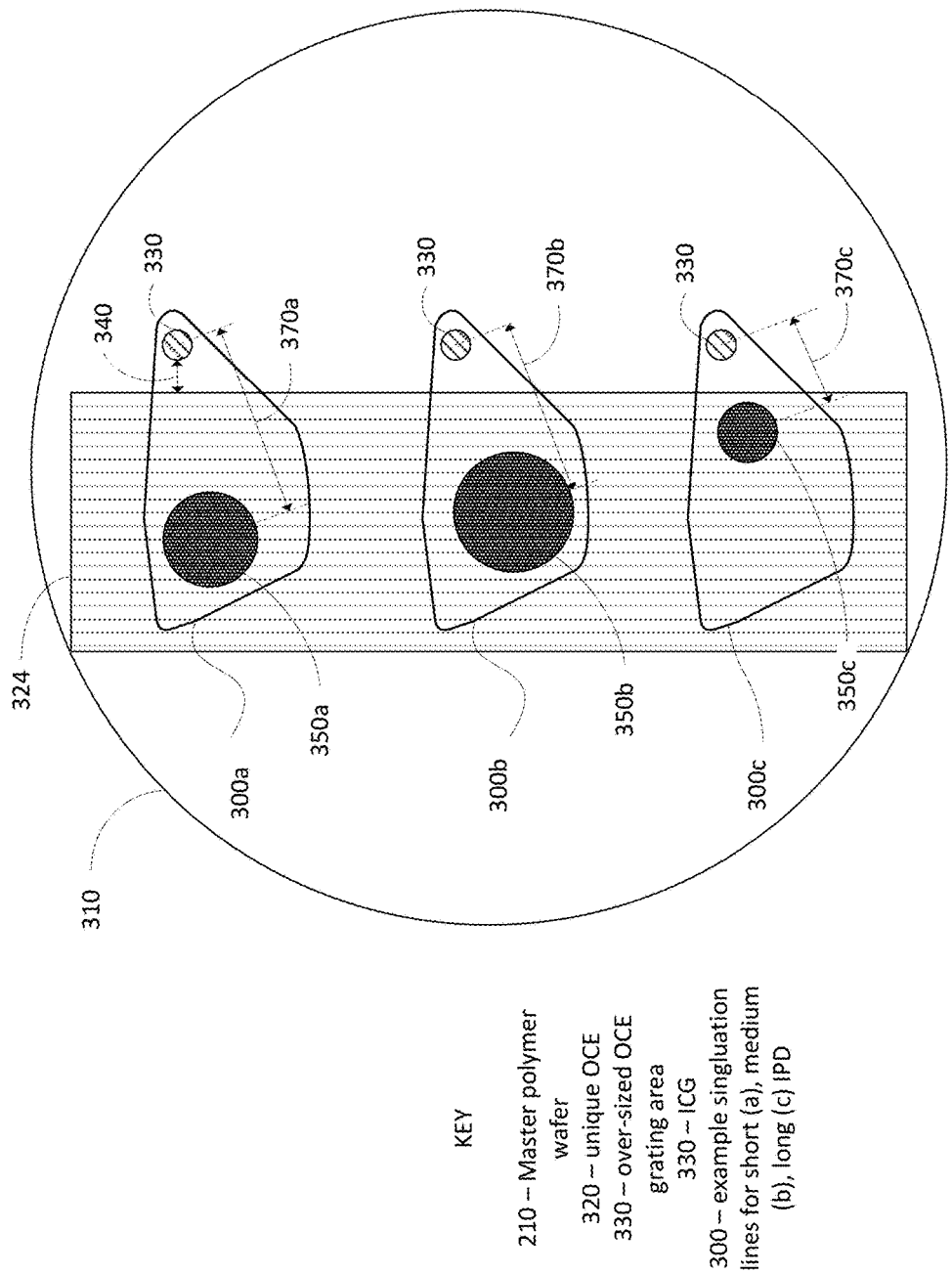
FIG. 3 is a second schematic diagram showing an example of a master polymer wafer with multiple surface grating areas and example singulation lines for multiple lenses.

While the foregoing example features over-sized grating areas for ICGs 130, other implementations are possible. For example, FIG. 3 shows a second example of a master polymer wafer 310 with multiple surface grating areas. Here, the master polymer wafer 310 is cast with a single over-sized surface grating area 324 and three further surface gratings corresponding to ICGs 330 separated by a smooth area 340.

In this example, eyepieces 300a-300c are singulated from master polymer wafer 310 to provide OCEs 350a, 350b, and 350c, respectively, each of a different size and each spaced a different amount (370a, 370b, and 370c, respectively) from the ICG. The over-sized surface grating area 324 can be sized and shaped to provide the desired number of eyepieces with OCEs in desired locations with respect to the ICGs. This area can have a lateral dimension that is 100 mm or more (e.g., 350 mm or more, 200 mm or more. In some embodiments, grating area 324 can span a diameter of the wafer 310.

Over-sized surface grating area 324 is de-functionalized to create the three OCEs 350 with different lateral dimensions. Accordingly, the center-to-center distances 370 between the ICGs 330 and the OCEs 350 can be controlled. FIG. 3 depicts three exemplary center-to-center distances 370a, 370b, and 370c which can correspond to exemplary short, medium, and long IPDs 190, respectively.

Note that while the two foregoing examples depict forming an over-sized grating for either the ICGs or the OCEs, in some implementations over-sized gratings can be formed for both.

Turning now to the process of grating de-functionalization, this generally involves planarizing the surface grating structure so that the de-functionalized portion of the grating area ceases to function as a grating. FIGS. 4A and 4B depict an example process of metallization and de-functionalization of the over-sized surface area 422 corresponding to an ICG 130 shown in FIG. 1A as discussed above.

FIG. 4A shows a sectional view of master polymer wafer 410 including a substrate portion 412 with surface grating area 420 corresponding to an OCE and over-sized surface grating area 422 for providing ICG 130.

As shown in FIG. 4B, before de-functionalizing portion of surface grating area 422, a reflective material 426 (e.g., a metal) is deposited in a portion 423 of grating area 422 corresponding to the ICG.

A polymer layer 440 is then cast over the remaining grating area 422, planarizing the entire area. Generally, the polymer used to planarize grating area 422 has the same or close to the same refractive index as the material forming grating area 422, thereby de-functionalizing the grating. In some embodiments, the same material is used or both the grating and the planarizing polymer.

The polymer layer 440 may be cast to a height greater than the height of the metallized ICG area 423. In some embodiments, the polymer layer 440 can cover the metallized ICG area 423 by a depth 430 range from 10 nm to 100 nm, for example (e.g. 10 nm or more, 20 nm or more, 30 nm or more, 40 nm or more, 50 nm or more, such as 90 nm or less, 80 nm or less, 70 nm or less, 60 nm or less).

Figure 5A:
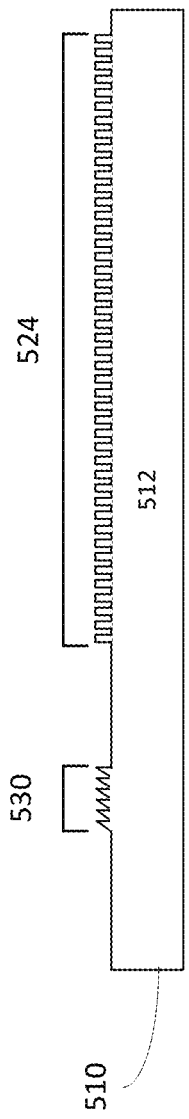
FIGS. 5A and 5B are schematic diagrams showing an example method for de-functionalizing surface grating areas corresponding to an out-coupling expanders.
Figure 5B:
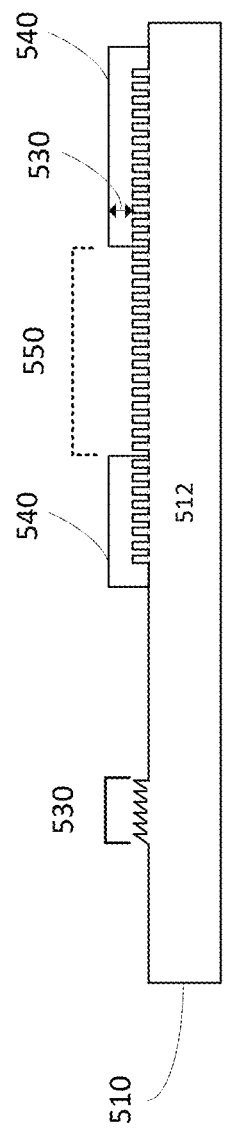

Additional implementations of grating de-functionalization can be considered. For example, FIGS. 5A and 5B depict an example process of de-functionalization of the over-sized surface grating area 524 to correspond with an OCE. FIG. 5A shows a transverse view of master polymer wafer 510 made of a first material 512 with a first over-sized surface grating area 524 and an ICG 530, as shown in FIG. 3.

FIG. 5B demonstrates the de-functionalization of unwanted OCE surface grating areas through planarization. The over-sized surface grating area 524 can be de-functionalized by casting another polymer layer to planarize outside the selected functional OCE area. Generally, the polymer used to planarize grating area 524 has the same or close to the same refractive index as the material forming grating area 524, thereby de-functionalizing the grating. In some embodiments, the same material is used or both the grating and the planarizing polymer.

As shown in FIG. 5B, after planarization of the over-sized surface grating area 524 only a selected OCE grating area 550 can remain. The polymer layer 540 may be cast to a height greater than the height of the over-sized surface grating area 524. In some embodiments, the polymer layer 540 can cover the over-sized surface grating area 524 by a depth 530 range described previously.

There can be several methods to accomplish the de-functionalization of grating areas on a master polymer wafer through planarization. In some embodiments, the planarization may be accomplished through the deposition of polymer resin droplets and subsequently pressing the droplets into a uniform layer to de-functionalize the underlying grating. This de-functionalization method is depicted in FIG. 6.

FIG. 6A shows a transverse view of a master polymer wafer 610 with a surface grating area 620 on which multiple resin droplets 635 have been deposited in a pattern and volume to sufficiently fill in the area to be de-functionalized. FIG. 6B depicts a top-down view of the same master polymer wafer 610 with deposited resin droplets 635. The surface grating area 620 can correspond to be an over-sized ICG or OCE surface grating area as described above. The resin droplets 635 have the same or close to the same refractive index as the material forming the surface grating area 620.

The depicted process continues in the transverse view of FIG. 6C. The resin droplets 635 are then contacted with a flat surface 645 and pressure 670 applied such that the resin droplets 635 spread to create a de-functionalized area 655, a leaving a portion of the surface grating area 620 unchanged. The de-functionalized area 655 is then cured with ultra-violet (UV) light 660.

As shown in FIG. 6D, the flat surface 645 is then removed, leaving the selected grating area 620 outside of the de-functionalized area 655 unchanged. FIG. 6E shows a top-down example of the de-functionalized area 655 after the resin droplets 635 have been spread and cured to create a de-functionalized area 655. In some embodiments, the de-functionalized area 655 can be less than the total surface grating area 620.

An alternative means to de-functionalize the grating areas on a master polymer wafer is depicted in FIGS. 7A through 7C. The de-functionalization shown can be accomplished through the use of a stamp, heat, and pressure to depress and planarize selected gratings to the height of the master polymer wafer.

FIG. 7A shows a transverse view of master polymer wafer 710 with an over-sized surface grating area 720 to be de-functionalized. In some embodiments, the master polymer wafer 710 can be cured below a cross-linking threshold for the material chosen (e.g., 70% for a suitable Thiolene-based polymer) so that the material can still be readily deformed.

Referring to FIG. 7B, the master polymer wafer 710 is contacted with a heat stage 780. In some embodiments, the stage 780 can be heated to a range between 60° C. and 120° C. (e.g., between 60° C. and 100° C., between 60° C. and 80° C., between 80° C. and 100° C., between 80° C. and 120° C.). The stage 780 is heated to a temperature at which the master polymer wafer 710 material can deform under pressure without melting the over-sized surface grating area 720.

A stamp 790 with a void 750 is positioned above the master polymer wafer 710 to align the void 750 with a selected area of the over-sized surface grating area 720. The stamp 790 is shown having a lateral dimension of greater size than the over-sized surface grating area 720. Generally, the stamp can be made of a material of sufficient hardness to planarize the over-sized surface grating area 720 without itself deforming (e.g., metal).

The depth of the void 750 of FIG. 7B is greater than the over-sized surface grating area 720. In this manner, the over-sized surface grating area 720 under the void 750 remains unchanged after pressure is applied. The stamp 790 is shown as having one void 750, though there can be more (e.g., two, three, four or more) depending on how many discrete grating areas are desired.

The stamp 790 is contacted with the master polymer wafer 710 while the wafer is heated by heat stage heated stage 780. Sufficient pressure 770 is applied to planarize a portion of the over-sized surface grating area 720 in contact with stamp 790 (i.e., not aligned with the void 750) to de-functionalize those areas.

As shown in FIG. 7C, the stamp 790 is removed from the master polymer wafer 710 and the master polymer wafer 710 removed from the stage 780, leaving only a selected surface grating area 721.

While FIGS. 7A-7C depict a stamp 790 with a single void 750 of uniform depth so that the portion of the grating that is aligned with the void is not deformed, in some embodiments, the void 750 can be designed to imprint a different pattern into the over-sized surface grating area 720 than what is originally cast into the master polymer wafer 710.

For example, a grating inset in the stamp can be used to modify or replace a portion of the over-sized surface grating area of a master polymer wafer. Inset gratings can have different pitch, depth, duty cycle, or orientation from the over-sized surface grating area originally cast into the master polymer wafer. In some embodiments, the inset gratings can include a combination of modifications. The use of a stamp with an inset grating can de-functionalize a portion of the over-sized surface grating area while re-functionalizing the remaining portion. FIGS. 8A-8C depict a stamp with an inset grating for modifying the over-sized surface grating area of the master polymer wafer.

FIG. 8A depicts a transverse view of master polymer wafer 810 with an over-sized surface grating area 820 to be modified. FIG. 8B depicts the positioning of a stamp 890 with an inset grating 852 above the master polymer wafer 810 such that the inset grating 852 aligns with a selected portion of the over-sized surface grating area 820 area to be re-functionalized. The stamp 890 is shown with one inset grating 852 though in general, the stamp 890 can have more than one inset grating 852 (e.g., two, three, or four or more). In some embodiments, the stamp 890 can have a combination of inset gratings and uniform voids.

The stamp 890 is then contacted to the master polymer wafer 810 being heated upon a stage 880. Pressure 870 is applied to the stamp 890 to de-functionalize the over-sized surface grating areas 820 not positioned beneath the inset grating 852 and re-functionalize the remaining surface grating area 821.

As shown in FIG. 8C, the stamp 890 is then removed from the master polymer wafer 810 and the master polymer wafer 810 removed from the stage 880 leaving only the master polymer wafer 810 with the re-functionalized surface grating area 821.

Figure 9:
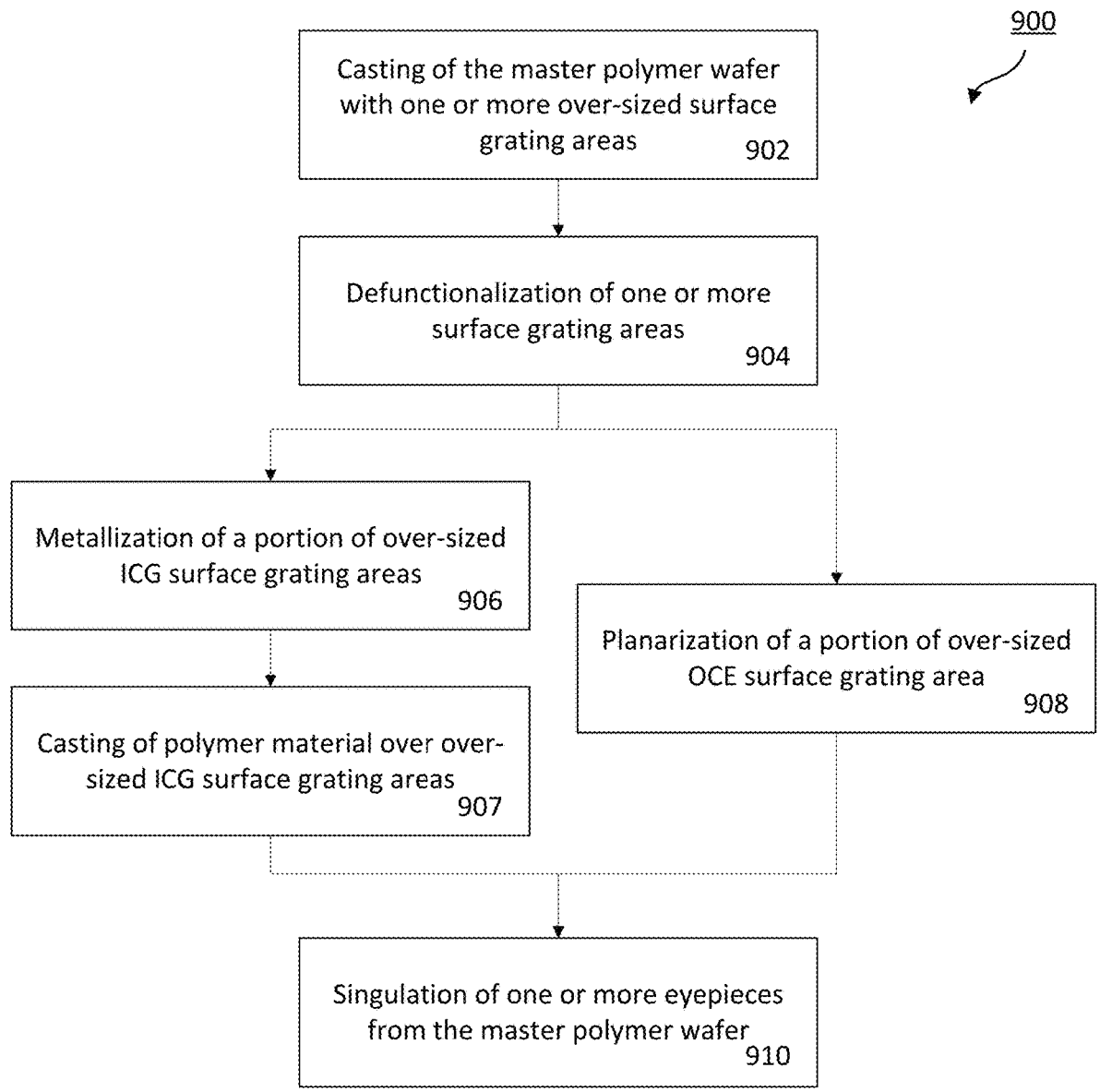
FIG. 9 is a flow chart showing an example method for singulating multiple eyepieces from a master polymer wafer.

The processes described above are summarized in FIG. 9 showing a flowchart of an example singulation process 900 for producing multiple eyepieces from a master polymer wafer. The singulation process 900 begins by casting a master polymer wafer with one or more over-sized surface grating areas (902) corresponding to the grating necessary for an ICG, or an OCE. Examples of master polymer wafers including an over-sized ICG grating are shown in FIG. 2, and examples including an over-sized OCG grating are shown in FIG. 3. These over-sized surface grating areas can provide for the control of one or more design parameters in the final eyepiece, including varying IPD lengths, OCG diameters, or center-to-center distances.

The one or more surface grating areas on the master polymer wafer 210 is then de-functionalized (904). The process of de-functionalization for master polymer wafers with over-sized ICG surface grating areas is done through metallization of a selected surface grating area and casting of a new polymer material to cover the surface grating area. The process of de-functionalization of master polymer wafers with over-sized OCE surface grating areas can be done through casting of new polymer materials or alternatively through the use of a heated stand and stamp.

Master polymer wafers with over-sized ICG surface grating areas first have a portion of their area metallized (906) to correspond with light input from the projector. The metallized area is further positioned to control the center-to-center distance between the ICG and the OCE after singulation.

Following metallization of a portion of the over-sized ICG surface grating area, the remaining area is de-functionalized by casting new polymer material (907) to a depth sufficient to cover the metallized area and planarize the remaining surface grating.

Turning now to master polymer wafers cast with one or more over-sized OCE surface grating areas, portions of the grating areas are de-functionalized through planarization (908). The planarization can be accomplished through a combination of heat and pressure, or the casting of a new polymer material over selected areas.

As depicted in FIGS. 6A-6E, a first example of planarizing a portion of the over-sized OCE surface grating area is accomplished through the deposition of resin droplets. A pattern of resin droplets are deposited on selected portions and pressed into a planar layer with a flat surface. The resin is then cured with UV light and the flat surface removed, thereby de-functionalizing the selected areas of the over-sized OCE surface grating areas.

Alternatively, planarizing a portion of the over-sized OCE surface grating area is accomplished through the use of a stamp, as shown in FIGS. 7A-7C and FIGS. 8A-8C. In both examples, a master polymer wafer with an over-sized OCE surface grating area to be de-functionalized is placed upon a heat stage and heated to a temperature where the polymer material of the wafer is malleable. A stamp is then positioned over the surface grating area to be de-functionalized. In the examples of FIGS. 7A-7C, the stamp includes a void of greater depth than the over-sized surface grating area to leave the selected portion of the grating area unmodified. The examples of FIGS. 8A-8C include one or more inset grating patterns to both de-functionalize portions and re-functionalize the remaining surface grating areas.

The stamp is then brought into contact with the master polymer wafer and pressure applied to de-functionalize the selected surface grating area not positioned under the void or, optionally, re-functionalize the area beneath the inset grating. The stamp is then removed, leaving a selected surface grating area or a newly re-functionalized surface grating area.

Following the de-functionalization of the one or more over-sized surface grating areas, one or more eyepieces is then singulated (910) from the master polymer wafer. Generally, the eyepieces can be singulated to control the spacing between the ICG and OCE, and the positioning of the OCE within the eyepiece area to account for a specific IPD. The eyepieces can then be further processed as necessary and assembled into head-mounted displays.

A number of embodiments have been described. Other embodiments are in the following claims.

What is claimed is:

1. A method, comprising:
   providing a wafer comprising a first surface grating extending over a first area of a surface of the wafer and a second surface grating extending over a second area of the surface of the wafer;
   de-functionalizing a portion of at least one of the first surface grating in a first surface grating area or second surface grating in a second surface grating area, wherein the surface grating of the de-functionalized portion remains but ceases to function as a grating; and
   singulating an eyepiece from the wafer, the eyepiece comprising a portion of the first surface grating area and a portion of the second surface grating area,
   wherein the first surface grating in the eyepiece corresponding to an input coupling grating for a head-mounted display and the second surface grating corresponds to a pupil expander grating for the head-mounted display.

2. The method of claim 1, wherein de-functionalizing the portion of at least one of the first surface grating in the first surface grating area or second surface grating in the second surface grating area comprises planarizing the portion of the corresponding surface grating.

3. The method of claim 2, wherein planarizing the portion of at least one of the first surface grating in the first surface grating area or second surface grating in the second surface grating area comprises casting a material over the corresponding portion of the surface grating.

4. The method of claim 3, wherein the material being cast is the same material as the material forming the surface grating.

5. The method of claim 4, wherein the material is a polymer material.

6. The method of claim 1, further comprising depositing a reflective material on a portion of the first surface grating.

7. The method of claim 6, wherein the reflective material is a metal.

8. The method of claim 1, wherein the de-functionalized portion of the first surface grating area or second surface grating areas have a height above the that is greater than a height of the first surface grating or second surface grating.

9. The method of claim 8, wherein the height of the de-functionalized portion is no more than 100 nm greater than the height of the corresponding surface grating.

10. The method of claim 1, wherein providing the wafer comprises imprinting the first and second gratings onto the surface of the wafer.

11. The method of claim 1, wherein providing the wafer comprises a casting a wafer with the first and second gratings.

12. The method of claim 1, wherein the second area has a minimum lateral dimension of more than 30 mm.

13. The method of claim 1, wherein the pupil expander grating has a maximum lateral dimension of 30 mm or less.

14. The method of claim 1, wherein the input coupling grating has a maximum lateral dimension of 5 mm or less.

15. The method of claim 1, further comprising assembling the eyepiece in a head-mounted display.

16. An article comprising:
a planar waveguide formed from a polymer material, the planar waveguide comprising a first surface, the first surface comprising:
a first surface grating;
a second surface grating spaced apart from the first surface grating; and
a smooth portion between the first and second surface gratings,
wherein the smooth portion comprises a first region at a first surface height, the first and second surface gratings each extend above the first surface height, and the smooth portion comprises a second region adjacent either the first or second surface grating, the second region extending to a height above the adjacent surface grating,
wherein the second region extends laterally over a de-functionalized portion of the first or second surface grating by a distance which is greater than a pitch of the grating and the de-functionalized portion ceases to function as a grating.

17. The article of claim 16, further comprising a reflective layer supported by the first surface grating.

18. The article of claim 17, wherein the first surface grating and the reflective layer are configured to couple light incident into the planar waveguide propagating towards the second surface grating.

19. The article of claim 16, wherein the second surface grating is configured to direct light guided by the waveguide out of the waveguide.

20. The article of claim 16, wherein the second region extends 100 nm or less above the adjacent surface grating.

* * * * *

UNITED STATES PATENT AND TRADEMARK OFFICE
CERTIFICATE OF CORRECTION

| | | |
|---|---|---|
| PATENT NO. | : 11,740,469 B2 | |
| APPLICATION NO. | : 17/359195 | |
| DATED | : August 29, 2023 | |
| INVENTOR(S) | : Chieh Chang et al. | |

It is certified that error appears in the above-identified patent and that said Letters Patent is hereby corrected as shown below:

On the Title Page

Column 2, item (56) (OTHER PUBLICATIONS), delete "Appln" insert -- Appln. --.

In the Claims

Claim 8, Column 10, Line 49, after "the" insert -- surface --.

Signed and Sealed this
Twenty-first Day of November, 2023

Katherine Kelly Vidal
*Director of the United States Patent and Trademark Office*